Figure 1:
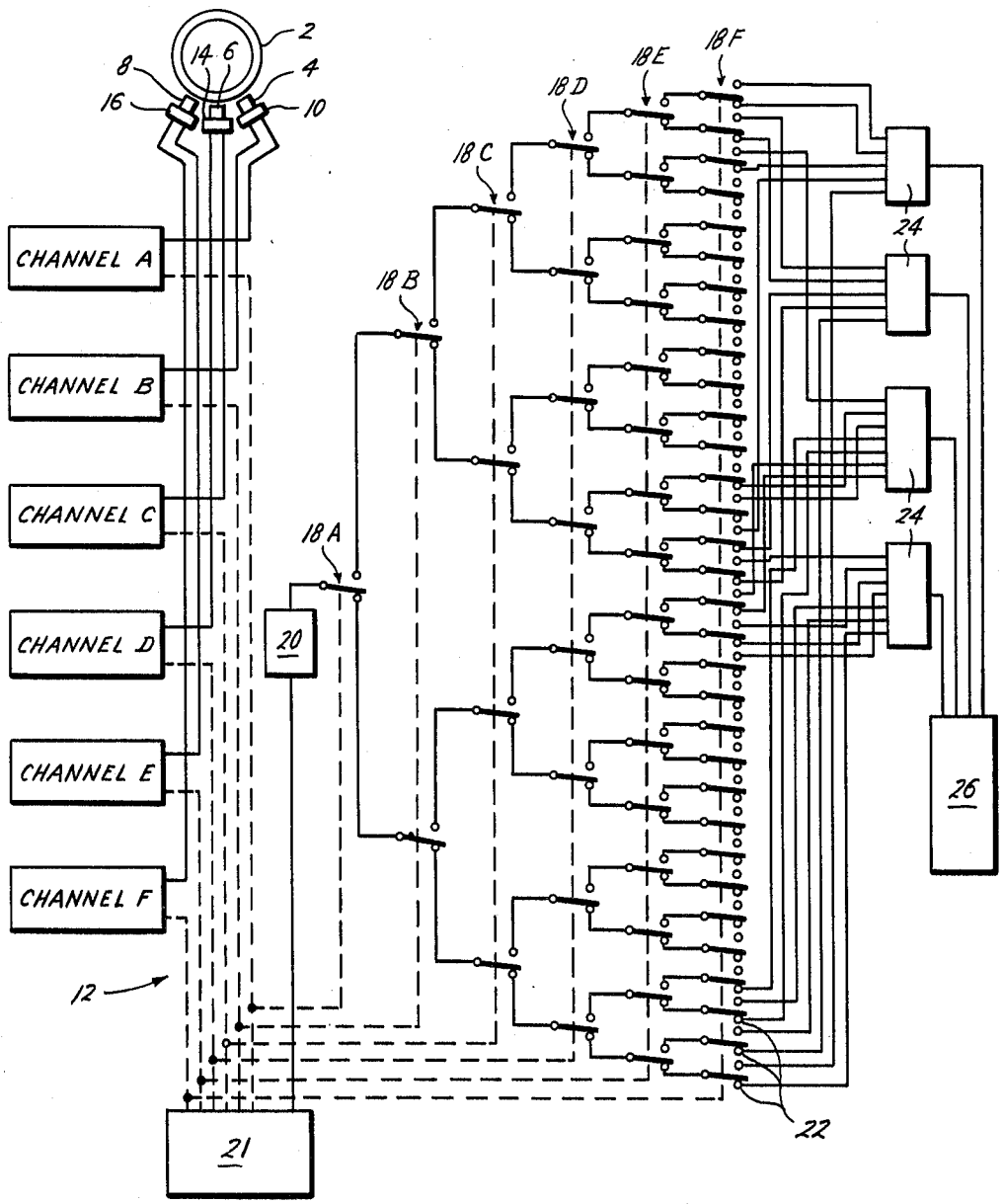

Dec. 7, 1965     W. A. GUNKEL     3,221,544
ULTRASONIC INSPECTION SYSTEM
Filed June 10, 1963     3 Sheets-Sheet 1

Walter A. Gunkel
INVENTOR.

BY Browning, Simms,
Hyer & Eickenroht
ATTORNEYS

Dec. 7, 1965 W. A. GUNKEL 3,221,544
ULTRASONIC INSPECTION SYSTEM
Filed June 10, 1963 3 Sheets-Sheet 2

Walter A. Gunkel
INVENTOR.

BY Browning, Simms,
Hyer & Eickenroht
ATTORNEYS

United States Patent Office 3,221,544
Patented Dec. 7, 1965

3,221,544
ULTRASONIC INSPECTION SYSTEM
Walter A. Gunkel, San Antonio, Tex., assignor to Southwest Research Institute, San Antonio, Tex., a trust estate of Texas
Filed June 10, 1963, Ser. No. 286,776
13 Claims. (Cl. 73—67.8)

This invention relates to ultrasonic inspection systems and is particularly directed to novel means for analyzing defect signals to determine the character of the defect.

In the art of ultrasonic inspection, it frequently is desirable to be able not only to recognize the presence of defects but also to be able to distinguish the various defects according to type, size, location in the material and the like. Thus, for example, in production inspection systems, the user must know as much as possible about each individual defect in order to set the reject or cull limit on a realistic basis. Normally, many different types of defects will be found in any article inspected. Moreover, most of these defects will be tolerable for some uses but will be cause for rejection where other uses are involved. In such systems, it would be desirable to be able to inspect the articles moving along a production line and to be able to automatically detect and analyze defects occurring in the articles so that the articles could readily be classified according to possible uses.

Defect discrimination can be accomplished in two ways: "primary" discrimination, which is the analysis of defect signals from a single transducer, and "secondary" or "combinational" discrimination, which is the analysis of combinations of discriminated signals from a plurality of transducers. In secondary discrimination, it is desirable to have each of the transducers arranged to provide different information about the defects. Thus, for example, one transducer could perform a through transmission measurement, a second transducer could provide a longitudinal pulse-echo measurement, a third transducer could perform a circumferential pulse-echo measurement and a fourth thickness measurement.

Insofar as is known, the prior art systems for defect discrimination have been primary discrimination systems which recorded the signals from the various transducers independently and relied upon analysis by the operator to provide the secondary information. However, such systems rely heavily upon the accuracy and judgment of the operator and provide considerable opportunity for human error.

These disadvantages of prior art systems are overcome with the present invention and novel means are provided for performing the secondary discrimination electrically in a manner which is substantially instantaneous and which completely eliminates the possibility of human error.

The advantages of the present invention are preferably attained by providing novel means for ultrasonic inspection comprising a plurality of transducers, means for performing a primary discrimination of the signals from each of the transducers, and electrical means for comparing and analyzing the results from all of the transducers to perform a secondary discrimination.

Accordingly, it is an object of the present invention to provide novel means for ultrasonic inspection.

Another object of the present invention is to provide novel means for performing secondary discrimination of defects detected by a multiple transducer inspection system.

A further object is to provide novel means for performing secondary discrimination of defects detected by a multiple transducer ultrasonic inspection system whereby said secondary discrimination is performed substantially instantaneously and human error is completely eliminated.

A specific object is to provide novel means for ultrasonic inspection comprising a plurality of transducers, means for performing a primary discrimination of the signals from each of said transducers, and electrical means for comparing and analyzing the results from all of the transducers to perform a secondary discrimination.

These and other objects and features of the present invention will be apparent from the following detailed description taken with reference to the figures of the accompanying drawings.

Figure 2A:
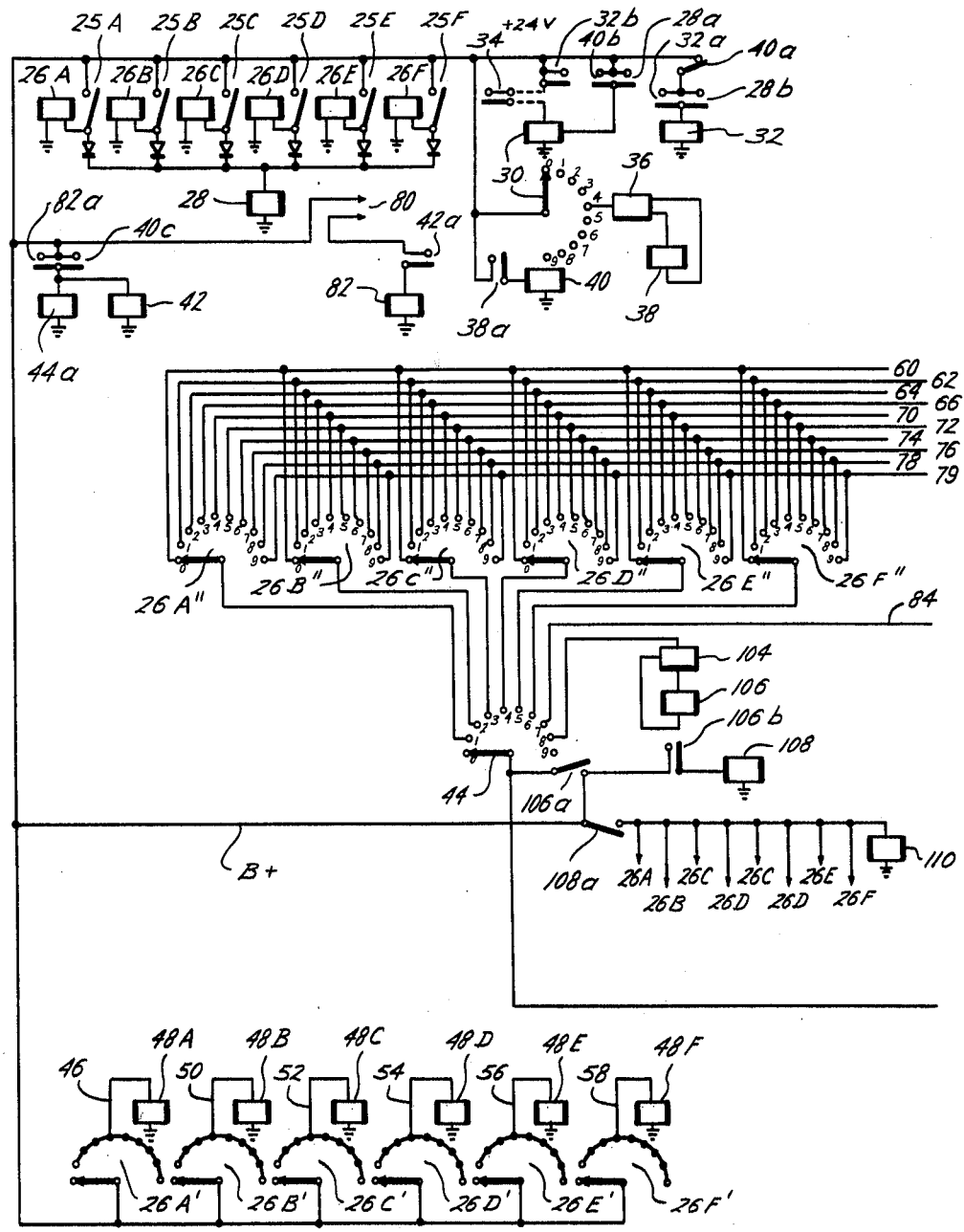
Figure 2B:
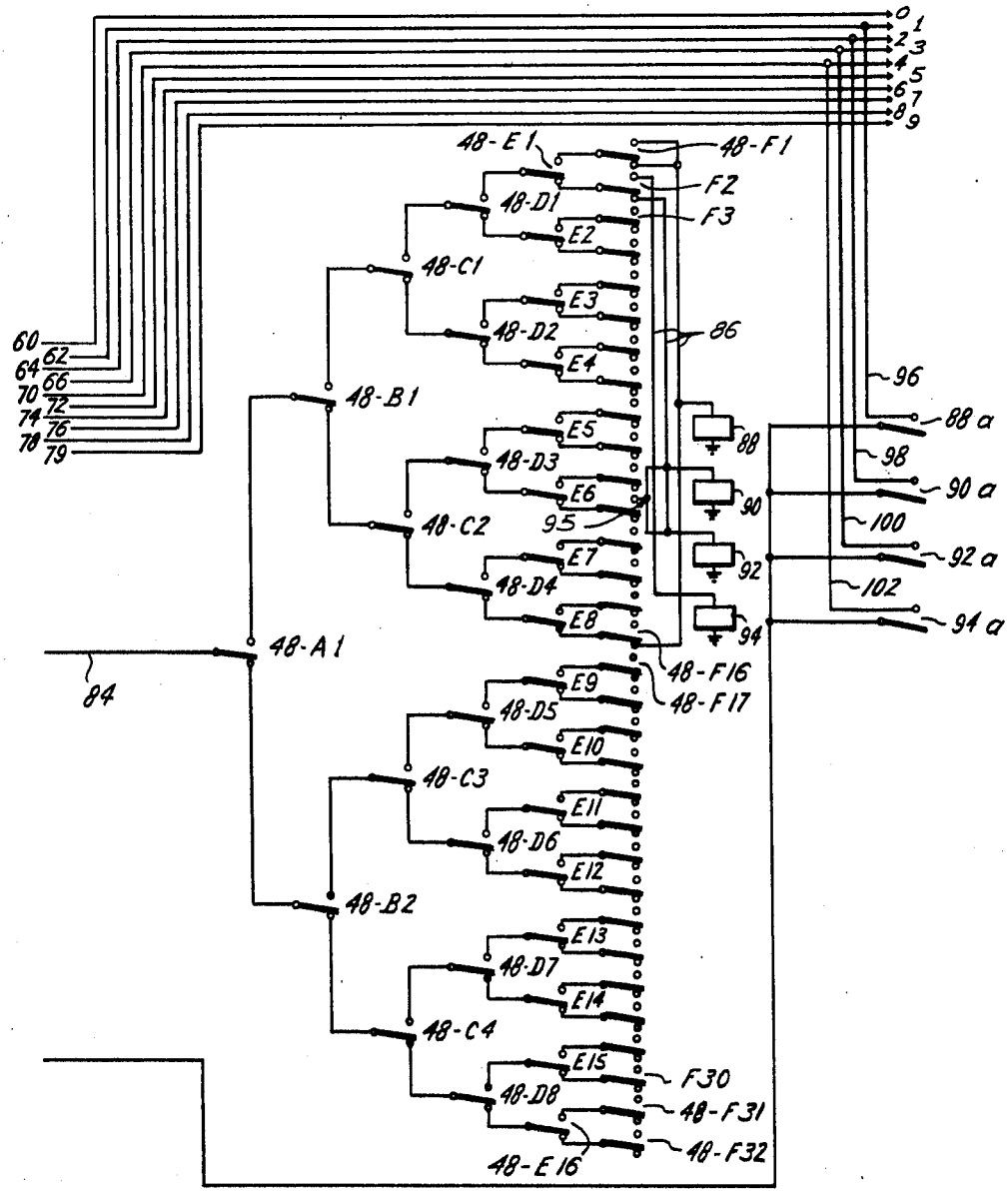

In the drawings:

FIG. 1 is a block diagram of an ultrasonic inspection system embodying the present invention; and FIGS. 2–A and 2–B illustrate a circuit diagram of the secondary discrimination portion of the apparatus of FIG. 1 and together will hereafter be referred to as FIG. 2.

In the form of the invention chosen for purposes of illustration, FIG. 1 shows an ultrasonic inspection system for use in production inspection of tubular articles, such as pipe or the like. In this form of inspection, the pipe 2 is rotated about its axis and is advanced longitudinally through the inspection station. At the inspection station, three ultrasonic transducers 4, 6 and 8 are arranged to survey a common diameter of the pipe 2 so that all of the transducers observe the same defect within less than one-half revolution of the pipe 2. If desired, time synchronization may be employed to achieve perfect time synchronization of the signals from the respective transducers. The transducers 4, 6 and 8 each provide different information concerning the defects which they observe. Thus transducer 4 may be a thickness measurement transducer and will detect defects which cause a variation of more than say 10% of the wall thickness of the pipe 2. The signals from transducer 4 are passed through suitable gate and amplifier circuits, indicated generally at 10, which perform a primary discrimination of the signals from transducer 4. The gate and amplifier circuits 10 may be conventional and, hence, are not shown in detail. However, if the defect may be characterized by a wall thickness which is too thin by more than 10% of the nominal wall thickness, the circuits 10 will apply a signal to channel A of the secondary discrimination circuits, indicated generally at 12. Similarly, if the defect is characterized by a wall thickness which is too thick by more than 10% of the nominal wall thickness, the circuits 10 will apply a signal to channel B of the secondary discrimination circuit 12. An improved thickness measuring system capable of this operation is shown in copending application Serial No. 225,441, filed September 24, 1962.

Transducer 6 may be a pulse-echo transducer beaming shear waves circumferentially of the pipe and, consequently, will be most sensitive to defects which are oriented primarily along the longitudinal axis of the pipe 2. The signals from transducer 6 will be passed through gate and amplifier circuits 14, which will perform the primary discrimination in a conventional manner, and will apply the signals to channel C of the secondary discrimination circuit 12 when the detected defect is on the outside surface or the pipe 2 and will apply the signals to channel D of the secondary discrimination circuit 12 when the detected defect is on the inside surface of the pipe 2. Similarly, transducer 8 may be a pulse-echo transducer beaming shear waves longitudinally along the pipe and will detect defects which are oriented primarily circumferentially of the pipe 2. The signals from transducer 8 will be passed through gate and amplifier circuits 16 which will perform the primary discrimination and will be applied to channel E of the secondary discrimination circuit 12 when the detected defect is on the outside surface of the pipe 2 and will be applied to channel F of the secondary discrimination circuit 12 when the detected defect is located on the inside surface of the pipe 2.

From the foregoing, it will be seen that the three transducers 4, 6 and 8 provide six channels of information. However, while each of the transducers supplies some information concerning any given defect, considerably more information about the defect can be obtained by comparing the information from all six channels. Thus, for example, assume that a defect is detected which causes a signal to appear only in channel C. This would indicate a longitudinally oriented defect occurring on the outside surface of the pipe and affecting less than 10% of the nominal wall thickness. Such a defect might very likely be a surface scratch. In contrast, a defect might be detected which would cause signals to appear on channels A, C and E simultaneously. This would indicate a defect having a wall thickness which is less than 90% of the nominal wall thickness and extends a considerable distance both longitudinally and circumferentially about the pipe. This might indicate a "dish" or dent in the outside surface of the pipe. A signal appearing in channels C and D would indicate a longitudinal crack.

It can readily be seen that numerous combinations of the signals are possible. In fact, it can be shown that the number of possible combinations is $2^n-1$, where "$n$" is the number of channels. Thus, for the six channel system shown in FIG. 1, there are $2^6-1=63$ combinations. Consequently, through secondary or combinational discrimination, it is possible to distinguish 63 different type of defects. On the other hand, as indicated above, many defects will be detected which may be cause for rejection where the pipe is intended for certain uses but which may be tolerable for other uses. Therefore, it is often possible to separate the various types of defects into a few generic categories, such as outside surface defects, inside surface defects, cracks or holes, laminations, etc. Alternatively, all defects which would cause rejection for a particular use might be grouped into Class I while those defects which would be tolerable for the first use but would cause rejection for a second use might be grouped in Class II.

Other uses could be represented by Class III, Class IV, etc. Obviously, such classification can be accomplished only after the secondary discrimination has been performed to determine the types of defects involved.

In order to accomplish the secondary discrimination automatically, the secondary discrimination circuit, indicated generally at 12 in FIG. 1, may be employed. Secondary discrimination circuit 12 comprises a switch network having a plurality of rows of switches 18–A, 18–B, 18–C, 18–D, 18–E and 18–F corresponding to the number of channels of information provided by the transducers 4, 6 and 8. Each of the switch rows 18–A through 18–F is controlled by a relay in the corresponding channels A through F, respectively, so that the positions of the switches is dependent upon which channels have received signals. In addition, suitable readout means 20 is provided and is actuated by the signals in channels A through F to pass a sensing signal through the switch network. All of the switches in each of the switch rows 18–A through 18–F move simultaneously to indicate the presence or absence of a signal in the corresponding channels A through F. Thus, as can be seen by tracing through the switch network, each combination of signals applied to the channels A through F serves to define a respective path through the switch network and terminates at a respective one of the output contacts 22 of the secondary discrimination circuit 12. In this way, the outputs of the transducers 4, 6 and 8 are effectively compared to distinguish a particular one of the many possible defect types.

As indicated above, it is often possible and desirable to sort the many defect types into a few generic classes or categories. In the apparatus of FIG. 1, this is accomplished by connecting appropriate ones of the output contacts 22 of the secondary discrimination circuit 12 through suitable OR circuits 24 and displaying the signals passed by the respective OR circuits 24 as indications of the defects occurring in the selected categories. These indications may be recorded or displayed by punched cards or other suitable readout means, indicated at 26.

Also a defect size information storage circuit 21 is provided. As the pipe is spiraled past the transducers 4, 6 and 8, a defect may be sensed a number of times by the same transducer before the pipe moves longitudinally far enough to move the defect out of the scan area. For example, a longitudinal defect two inches long may cause six separate defect signals due to it being long enough to be rotated six times past a transducer before it moves out of the transducer beam. Hence by counting the number of successive defect signals in any channel, the size of the defect can be determined. These signals are stored in storage circuit 21 and upon the defect signals stopping, readout 20 sends a signal to storage circuit 21 to cause the stored information to be transmitted to the readout means 26.

FIG. 2 is a detailed diagram of the secondary discrimination circuit 12 of FIG. 1 together with the OR circuits 24 for sorting the defect types in various selected classes or categories and to supply the information obtained to suitable card punching apparatus, such as an IBM machine, or other suitable readout means. As described above, the signals from the transducers 4, 6 and 8 are passed through appropriate gate and amplifier circuits to perform the primary discrimination and are then supplied to the respective channels A through F of the secondary discrimination circuit 12. The channels A through F each contain a relay, not shown, which is responsive to the presence or absence of a signal in the corresponding channel and controls a respective one of the switches 25–A through 25–F of FIG. 2. The circuits controlled by the switches 25–A through 25–F are identical in structure and operation. Accordingly, for simplicity, only the structure and operation of the circuit of channel A will be described. However, upon understanding this circuit, it will be apparent that the circuits of channels B through F are the same and function in the same manner.

Upon receipt of a signal by channel A, the relay of channel A closes switch 25–A energizing stepping switch coil 26–A to cause the gauged stepping switches 26–A' and 26–A" to step to their first positions. If a subsequent signal appears on channel A before the information has been read out, the relay of channel A will again close switch 25–A causing stepping switches 26–A' and 26–A" to step to their second position. Receipt of additional signals by channel A prior to readout will cause these stepping switches to be advanced appropriately. At the same time the stepping switches are advanced, a signal is passed to relay 28 to close contacts 28–$a$ and 28–$b$. Closure of contacts 28–$a$ causes a reset signal to be sent to stepping switch 30 to move it back to its zero position i.e. to be homed. As will be later described in more detail, stepping switch 30 is set up by the receipt of a defect signal to be stepped one position for each pipe revolution and to be reset to zero by the receipt of a successive defect signal. The stepping switch is so set up by closure of contacts 28–b which energizes relay 32 closing contacts 32–a and 32–b. Contacts 32–a serve to complete a holding circuit for relay 32 while contacts 32–b energizes a circuit through microswitch 34 to permit advancement of stepping switch 30. As described above, the pipe under inspection is revolved about its axis and is moved longitudinally past the inspection station. Microswitch 34 serves to advance stepping switch 30 one step each time microswitch 34 is closed. Moreover, microswitch 34 is arranged to be closed mechanically once during each revolution of the pipe. Stepping switch 30 serves to initiate actuation of the readout operation after a predetermined number of steps; after its fourth step, as shown. Since advancement of stepping switch 30 is controlled by microswitch 34, stepping switch 30 initiates the readout operation upon the fourth revolution of the pipe after the last defect signal has been received. Thus there will be four "clean" revolutions of the pipe before readout. As noted above, stepping switch 30 is reset to zero each time a defect signal appears in one of the channels A through F. Thus, if the rates of revolution and longitudinal movement of the pipe are constant, the length of the defect can be determined.

It is apparent that until a defect signal is encountered in one of the channels, the circuit is dormant. However, when a defect signal is encountered, it in turn operates relay means which sets up a circuit which will ultimately cause stored defect information to be read out but this will happen only after a certain defect free area has been inspected (here four pipe revolutions). Therefore as long as the defect is sensed by the transducers, a readout is prevented but when the pipe has moved lengthwise far enough that the defect is not sensed for a predetermined number of revolutions, the accumulated defect intelligence is read out and the magnitude of it is a function of defect size.

Thus, when stepping switch 30 has advanced the predetermined number of steps, it supplies a readout signal by triggering univibrator 36 which actuates relay 38. This closes contacts 38–a and energizes relay 40. This opens normally closed contacts 40–a so that holding contacts 32–a can open and relay 32 de-energized. This in turn opens contacts 32–b to prevent further stepping of switch 30. At the same time, relay 40 closes contacts 40–b and 40–c. Closure of contacts 40–b resets stepping switch 30 to zero while closure of contacts 40–c energizes relay 44–a to initiate the readout operation by causing stepping switch 44 to advance to its first position. At the same time, closure of points 40–c energizes latching relay 42 to close points 42–a to thereby set up relay 82 for a purpose to be described below. In the meantime, the period of the univibrator 36 has expired and relay 38 has been de-energized to open contacts 38–a to in turn de-energize relay 40 and open contacts 40–b and 40–c and close contacts 40–a whereby the counting circuit is set up to be again actuated by the next series of defect signals.

The stepping switch coils 26–A through 26–F respectively control the position of the wipers of the gauged stepping switches 26–A′ through 26–F′ and 26–A″ through 26–F″. Thus, whenever a defect is detected, a signal is supplied to one of the signal channels, such as channel A, and the corresponding stepping switch coil, in this case switch coil 26–A, advances stepping switches 26–A′ and 26–A″. Should several signals be supplied to any given signal channel prior to initiation of the readout operation, the corresponding stepping switches would be advanced. For example, if four signals should be received by channel A prior to initiation of the readout operation, stepping switch coil 26–A would advance stepping switches 26–A′ and 26–A″ so that their wipers engage the No. 4 contacts. Similarly, if two signals were received by channel D during the same period, stepping switch coil 26–D would advance the wipers of 26–D′ and 26–D″ to engage the No. 2 contacts.

As indicated above, the number of times one of the switches 26–A″ to 26–F″ steps is directly indicative of the size of the defect since the pipe is moving spirally past the inspection heads which pick up the defect signal. Therefore, if one of these switches steps six times before readout, the defect will be approximately six times as long as the spiral lead through which the pipe is being rotated. Thus, the switches 26–A″ through 26–F″ will store information concerning the size of the defect and to the extent that such information can be categorized in six channels, it also denotes information concerning the characteristics of the defect. However, the latter is not its prime function but such is the function of the combinational discrimination circuit to be described below.

The combinational discrimination circuit comprises a means for storing information concerning the receipt of a defect signal in each of the channels 25–A through 25–F, regardless of the number of times this defect signal is received before readout. An expansion matrix is also provided to apply stored defect signals form the channels into one of $2^n$ outputs depending upon the particular combination of channels which have stored defect information. In this case "$n$" is the number of defect storage channels. These outputs can then be combined into $2^n-1$ different combinations if desired in order to provide final output signals which reflect the receipt of information from any particular input channel or any combination thereof.

Thus referring to FIG. 2, all of the contacts, except the first, of stepping switch 26–A′ are connected together and are joined by conductor 46 to relay 48–A which controls switch 48–A1 of the switch network. Normally, the arm of switch 48–A1 engages the lower contacts of switch 48–A1. However, when relay 48–A is energized, due to engagement of one of the contacts of contact set 26–A′ by the wiper of stepping switch 26–A, the arm of switch 48–A1 moves to engage the upper contacts of the switch. In other words, storage of one or more defect signals will cause switch 48–A1 to close its upper contacts and open its lower ones. Similarly, each of the contacts of contact set 26–B′ are connected together and are joined by conductor 50 to relay 48–B which controls switches 48–B1 and 48–B2 of the switch network. Switches 48–B1 and 48—B2 are controlled by relay 48–B in the same manner that switch 48–A1 is controlled by relay 48–A. In the same way, the contacts of contact sets 26–C′ through 26–F′ are connected by respective conductors 52, 54, 56 and 58 to relays 48–C, 48–D, 48–E and 48–F, respectively. Relay 48–C controls switches 48–C1, 48–C2, 48–C3 and 48–C4 of the switch network. Relay 48–D controls switches 48–D1 through 48–D8 of the switch network. Relay 48–E controls switches 48–E1 through 48–E16 of the switch network. Relay 48–F controls switches 48–F1 through 48–F32 of the switch network.

Since the switches 48–A1 through 48–F32 each have two positions, depending upon whether or not the corresponding relays 48–A though 48–F are energized, it will be seen that the switch network has a total of 64 possible outputs and, as described in connection with FIG. 1, it can be shown that any given combination of defect signals appearing on the channels A through F will define one, and only one, path through the switch network and will terminate at a respective one of the 64 outputs 22 of the switch network.

At this time, the defect information has been stored in stepping switches 26–A″ to 26–F″ and the switches of the expansion matrix have been positioned in accordance with the combination of defect signals received in the various channels. Hence the readout operation is initiated by advancement of stepping switch 44 to its first position. As described above, four "clean" revolutions of the pipe causes relay 40 to be energized momentarily to close contacts 40–c. This energizes stepping switch coil 44–a and hence advances stepping switch 44 one position. This completes a circuit from a suitable voltage source, such as B+, through the wiper of stepping switch 26–A″ and the appropriate contact on which the wiper is positioned and then through a respective one of the conductors 60 through 79 to a readout mechanism, not shown, which may be a card punching machine of the IBM type or other conventional readout means. The readout mechanism records this signal, as by punching an appropriate indication in the first column of a card and then momentarily closes contacts 80 as by a cam in the readout mechanism, to energize relay 82. Relay 82 then closes contacts 82–a to advance stepping switch 44 to its second position. In this position, stepping switch 44 completes a circuit through the wiper of stepping switch 26–B″ and the contact thereof on which the wiper is positioned and then through the corresponding one of the conductors 60 through 79 to the readout mechanism. This information is suitably recorded, as by punching an indication in the second row of a card. Again, contacts 80 are closed to energize relay 82 causing stepping switch 44 to be advanced to its third position. This procedure is repeated until the information of channels C, D, E and F has been recorded, as by punching indications in rows three through six of a card. Thereafter, stepping switch 44 is advanced to its seventh position and supplies a signal through conductor 84 to the expansion matrix. This signal traces its way through the matrix along the path defined by the positions of switches 48–A1 through 48–F32, as described above, to an appropriate one of the outputs 22 of the matrix.

As described above, the 64 ouputs 22 of the matrix correspond to 64 different combinations of the information provided in the six signal channels 25–A through 25–F from transducers 4, 6 and 8. Not all of these combinations may present useful information in any given circumstance. In order to separate these 64 combinations of information into a few generic classes, some of the 64 outputs of the switch network may be connected, as by conductors 86, to supply signals to any one or more of the OR circuits, represented in FIG. 2 by relays 88, 90, 92 and 94. It will be apparent that any given type of output may be pertinent to two or more of the classes represented by the respective OR circuits. In such instances, the particular output 22 of the switch network would be connected to two or more of the relays 88 through 94. Such a situation is indicated at 95. The relays 88 through 94 control switches 88–a through 94–a, respectively, and when stepping switch 44 sends a signal through the matrix, in the manner described above, switches 88–a through 94–a will complete circuits through respective conductors 96 through 102 to provide indications which may be punched in the seventh column of a card or may be otherwise recorded.

Upon completion of the readout operation, the readout mechanism will once more close contacts 80 to energize relay 82 to advance stepping switch 44 to its eighth position. This supplies a pulse which triggers univibrator 104 to energize relay 106. Relay 106 opens contacts 106–a and closes contacts 106–b. Contacts 106–a break the circuit from B+ to the wiper of stepping switch 44 to prevent sending false signals to the readout mechanism while closing of contacts 106–b permits energization of relay 108. This causes contacts 108–a to close to connect the B+ to all of the stepping switches 26–A through 26–F, 30 and 44 to reset these stepping switches to zero. In addition, a signal is passed to relay 110 which breaks the circuit of latching relay 42 and, thereby conditions the system for a subsequent operation.

While the system of the present invention has been described herein in conjunction with a production inspection system for tubular articles, it will be obvious that the present invention is not limited to such a system. Furthermore, it will be apparent that the number of input channels may be varied considerably and will depend upon the number and type of sensing transducers employed. Moreover, if desired, the OR circuits could be omitted and the various defect types could be recorded. In addition, although the circuit of the present invention has been described as used with an IBM type card punching machine, it will be obvious that other readout mechanism could be employed equally well. Also, the switches of the matrix can be of any suitable type including diodes.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An ultrasonic inspection system comprising a plurality of electro-acoustic transducers for converting ultrasonic acoustic signals passing from an article being inspected into electrical signals, means for performing a primary discrimination of the signals from each of said transducers, a plurality of signal responsive means, means for supplying the discriminated signals from said transducers to respective ones of said signal responsive means, a switch network including a plurality of switches, means controlled by respective ones of said signal responsive means for actuating selected ones of said switches to define an electrically conductive path through said switch network, means for passing an electrical signal through said switch network along said path, and means responsive to said electrical signal for indicating the particular path along which said signal has passed.

2. An ultrasonic inspection system comprising a plurality of electro-acoustic transducers for converting ultrasonic acoustic signals passing from an article being inspected into electrical signals, means for performing a primary discrimination of the signals from each of said transducers, a plurality of signal responsive means, means for supplying the discriminated signals from said transducers to respective ones of said signal responsive means, a switch network including a plurality of switches connected to provide a multiplicity of potentially electrical conductive paths through said network, each of said paths being connected to a respective output of said network, means controlled by respective ones of said signal responsive means for actuating selected ones of said switches to render a particular one of said paths conductive, means for passing an electrical signal through said network along said particular path, and means responsive to said electrical signal for indicating the particular path along which said signal has passed.

3. An ultrasonic inspection system comprising a plurality of electro-acoustic transducers for converting ultrasonic acoustic signals passing from an article being inspected into electrical signals, means for performing a primary discrimination of the signals from each of said transducers, a plurality of signal responsive means, means for supplying the discriminated signals from said transducers to respective ones of said signal responsive means, a switch network including a plurality of switches connected to provide a multiplicity of potentially electrically conductive paths through said network, means controlled by said signal responsive means for actuating selected ones of said switches to render a particular one of said paths conductive, each of said paths corresponding to a particular combination of said signal responsive means and each path being connected to a respective output of said network, means for passing an electrical signal through said network along said particular one of said paths, and means for indicating the particular output of said network receiving said electrical signal.

4. An ultrasonic inspection system comprising a plurality of electro-acoustic transducers for converting ultrasonic acoustic signals passing from an article being inspected into electrical signals, means for performing a primary discrimination of the signals from each of said transducers, a plurality of signal responsive means, means for supplying the discriminated signals from said transducers to respective ones of said signal responsive means, a switch network including a plurality of switches connected to provide a multiplicity of potentially electrically conductive paths through said network, means controlled by said signal responsive means for actuating selected ones of said switches to render a particular one of said paths conductive, each of said paths corresponding to a particular combination of said signal responsive means and each path being connected to a respective output of said network, means for passing an electrical signal through said network along said particular one of said paths, a plurality of OR circuits, each of said OR circuits being connected to receive signals from respective ones of the outputs of said network, and means for indicating which of said OR circuits has received said electrical signal.

5. An ultrasonic inspection system comprising a plurality of electro-acoustic transducers for converting ultrasonic acoustic signals passing from an article being inspected into electrical signals, means for performing a primary discrimination of the signals from each of said transducers, a plurality of relays, means for supplying each of the discriminated signals from said transducers to a respective one of said relays, a switch network including a plurality of switches connected to provide a plurality of potentially electrically conductive paths through said network, means controlled by each of said relays for actuating selected ones of said switches to render a particular one of said paths conductive, each of said paths corresponding to a respective combination of said relays and each path being connected to a respective output of said network, means for passing an electrical signal through said network along said particular one of said paths, and means for indicating the particular output of said network receiving said electrical signal.

6. An ultrasonic inspection system comprising a plurality of electro-acoustic transducers for converting ultrasonic acoustic signals passing from an article being inspected into electrical signals, means for performing a primary discrimination of the signals from each of said transducers, a plurality of relays, means for supplying each of the discriminated signals from said transducers to a respective one of said relays, a switch network including a plurality of switches connected to provide a multiplicity of potentially electrically conductive paths through said network, means controlled by each of said relays for actuating selected ones of said switches to render a particular one of said paths conductive, each of said paths corresponding to a respective combination of said relays and each path being connected to a respective output of said network, means for passing an electrical signal through said network along said particular one of said paths, means for indicating the particular output of said network receiving said electrical signal, and means for indicating the number of signals received by each of said relays.

7. An ultrasonic inspection system comprising a plurality of electro-acoustic transducers for converting ultrasonic acoustic signals into electrical signals so as together to provide a plurality of information signals; an expansion matrix including a switch network having a plurality of switches connected to provide a plurality of separate potentially electrically conductive paths through the network to a plurality of network outlets, one for each of said paths, said switches being connected so that for any condition of all the switches there is but a single conductive path through the network; means responsive to said information signals to render a particular one of said paths conductive depending upon the particular combination of information signals received; means for passing an electrical signal through said network along said particular one of said paths; and means for indicating the particular network output receiving said electrical signal.

8. An ultrasonic inspection system comprising a plurality of electro-acoustic transducers for converting ultrasonic acoustic signals into electrical signals so as together to provide a plurality of information signals in a plurality of channels; means for storing the number of successive signals received in each channel; an expansion matrix including a switch network having a plurality of switches connected to provide a plurality of separate electrically conductive paths through the network, said switches being connected so that for any condition of all the switches there is but a single one of said conductive paths through the network; means controlling said switches responsive to said information signals appearing in one or more of said channels so as to establish a different path through the network for each combination of information signals appearing in said channels; means responsive to cessation of successive information signals appearing in said channels for causing the number of stored signals in said storing means to be read out and for sending an electrical signal through said network along the particular path established in said network, and means for indicating the number of stored signals from each channel in said storing means and also the particular network output receiving the signal through said particular path.

9. The system of claim 8 wherein the transducers are arranged to scan an article to be inspected along successive parallel paths and wherein the said means responsive to cessation of information signals include means for generating a signal each time the transducers scan one of said paths, and means for delaying said readout and said sending of said electrical signal through the network until said signal generating means has generated a predetermined number of signals after the last information signal has appeared in said channels.

10. The system of claim 9 wherein said delaying means includes a stepping switch connected to be stepped each time said signal generating means generates a signal and to be homed each time an intelligence signal appears in one of said channels, said stepping switch also being connected to initiate said readout and sending said electrical signal through said network after it has been successively stepped more than once by said signal generating means.

11. An ultrasonic inspection system comprising a plurality of electro-acoustic transducers arranged so as to scan a pipe being spirally rotated therepast and to generate successive information signals in separate channels responsive to anomolies in said pipe; signal storage means for each channel; readout means for reading out the information stored in said storage means responsive to receipt of a readout signal; means for generating repetitive signals occurring as a function of rotation of the pipe; and means for generating said readout signal responsive to the receipt of a predetermined number of said repetitive signals after the last information signal has been received in said channels.

12. The system of claim 11 wherein said means for generating said readout signal includes a stepping switch connected to said repetitive signal generating means to be stepped for each such repetitive signal; means connecting said stepping switch to said channels to be homed by each information signal appearing therein; and means connecting said stepping switch to said readout means to send a readout signal thereto after the stepping switch has been stepped at least twice by said repetitive signal.

13. The system of claim 11 wherein an expansion matrix is provided including a switch network having a plurality of switches connected to provide a plurality of separate electrically conductive paths through the network, said switches being connected so that for any given condition of all the switches there is but a single one of said conductive paths through the network; means controlling said switches responsive to said information signals appearing in one or more of said channels so as to establish a different path through said network for each combination of information signals appearing in said channels; said readout means being connected to said matrix to also send an electrical signal through said network along the particular path established therein.

References Cited by the Examiner
UNITED STATES PATENTS

| | | | |
|---|---|---|---|
| 2,922,893 | 1/1960 | Ett | 340—147 |
| 3,052,115 | 9/1962 | Renaut et al. | 73—67.5 |

RICHARD C. QUEISSER, *Primary Examiner.*

DAVID SCHONBERG, *Examiner.*